United States Patent Office 3,047,548
Patented July 31, 1962

3,047,548
SYNTHETIC POLYMERS
Robert Y. Garrett, Avon Lake, Ohio, assignor to The
B. F. Goodrich Company, New York, N.Y., a corporation of New York
No Drawing. Filed Mar. 31, 1960, Ser. No. 18,849
10 Claims. (Cl. 260—80.7)

This invention relates to self-curing synthetic polymers and more particularly pertains to interpolymers containing units derived from a mixture comprising a conjugated diolefin, an ester of an alpha,beta-olefinically unsaturated monocarboxylic acid copolymerizable therewith, an alpha,beta-olefinically unsaturated carboxylic acid and an N-alkylol derivative of an olefinically unsaturated polymerizable carboxylic acid amide, latices of same, and to the method for preparing said interpolymers and latices.

Synthetic interpolymers of diolefins such as butadiene and isoprene with acrylate and methacrylate esters are well known and have established commercial utility. These interpolymers, however, are not particularly useful, per se, as coating agents, adhesives and the like. It is the usual practice to compound thermosetting resins, tackifiers and the like with the aforementioned well known synthetic interpolymers when they are to be used in coating or adhesion applications. The particular compounding formulation required for a given application may vary greatly. It would be highly desirable to obtain a single homogeneous polymeric composition which could be used with little or no modification in diverse applications.

Accordingly, an object of the present invention is the provision of modified synthetic polymers, primarily of the conjugated diolefin-acrylic ester type, which have unexpectedly good adhesive properties. Another object is the provision of novel linear synthetic polymers which cure readily upon moderate heating. Another object is the provision of novel synthetic polymer latices which are extremely useful in dipping and coating applications. Still another object is the provision of a method for preparing the aforementioned novel synthetic polymers and their latices.

The accomplishment of the foregoing and other objects will become apparent from the following description and examples, it being understood that many modifications and changes can be made in the products and processes disclosed herein by those skilled in the art without departing from the spirit and scope of this invention.

I have discovered a novel composition comprising an interpolymer composed of units derived from a polymerized mixture of (1) from about 50 to about 93% by weight of a conjugated diolefin, (2) from about 4 to about 49.8% by weight of an ester of an alpha,beta-olefinically unsaturated monocarboxylic acid copolymerizable with (1), (3) from 0 to 5% by weight of a vinyl cyanide, (4) from 0 to 5% by weight of a monovinyl aromatic compound, (5) from about 0.1 to 5% by weight of an N-alkylol amide of an alpha,beta-olefinically unsaturated carboxylic acid, and (6) from about 0.1 to about 10% by weight of an alpha,beta-olefinically unsaturated carboxylic acid.

The conjugated diolefins useful in the present invention are those of from about 4 to 9 carbon atoms including the well known diene hydrocarbons such as butadiene-1,3, isoprene, piperylene, 2,3-dimethyl butadiene-1,3, 2-ethyl-butadiene-1,3, hexadiene-1,3, 4-methyl-1,3-pentadiene, and the like and halogenated dienes such as chloroprene, bromoprene, and fluoroprene. The preferred diolefins are butadiene-1,3, isoprene, piperylene, and 2-halogenated butadiene-1,3.

The esters of alpha,beta-monoolefinically unsaturated monocarboxylic acids embodied in this invention are of the type

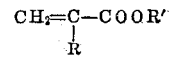

wherein R is a member selected from the class consisting of hydrogen, an alkyl group having from 1 to 6 carbon atoms, a halogen, and a cyano group, and R' is a hydrocarbon group having from 1 to 12 carbon atoms. Representative monomers of the foregoing type are methyl acrylate, ethyl acrylate, the propyl acrylates, the butyl acrylates, the amyl acrylates, the hexyl acrylates, cyclohexyl acrylate, phenyl acrylate, the octyl acrylates and the dodecyl acrylates, methyl methacrylate, ethyl methacrylate, cyclohexyl methacrylate, dodecyl methacrylate, ethyl alpha-cyano acrylate, ethyl-alpha-bromo acrylate and the like. Most preferred are the lower alkyl acrylic and methacrylic acid esters having from 4 to 7 carbon atoms.

The vinyl cyanides useful in the compositions embodied herein and more particularly the monovinyl cyanides include those having from 3 to 10 carbon atoms such as acrylonitrile, methacrylonitrile, ethacrylonitrile, vinylidene cyanide, and the like.

The monovinyl aromatic monomers embodied herein include those having from 8 to 18 carbon atoms such as styrene, alpha-methyl styrene, the vinyl toluenes, the alpha-methyl vinyl toluenes, the vinyl xylenes, the vinyl naphthalenes and the like.

The N-alkylol amides of alpha,beta-olefinically unsaturated carboxylic acids embodied herein include those having from 4 to 10 carbon atoms such as N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-methylol amides of the vinyl aromatic acids such as N-methylol-p-vinyl benzamide, and the like and others. The preferred monomers of the N-alkylol amide type because of their ready availability and relatively low cost are the N-alkylol amides of monoolefinically unsaturated monocarboxylic acids and the most preferred are N-methylol acrylamide and N-methylol methacrylamide.

The alpha,beta-olefinically unsaturated carboxylic acids useful in this invention are those having from 3 to 6 carbon atoms, representative members of which include acrylic acid, methacrylic acid, ethacrylic acid, alpha-chloro acrylic acid, maleic acid, fumaric acid, itaconic acid, mesaconic acid, citraconic acid, sorbic acid and the like and the anhydrides thereof. The preferred monomers of this type are the alpha,beta-monoolefinically unsaturated carboxylic acids such as acrylic acid, methacrylic acid and maleic anhydride. The most preferred are the alpha,beta-monoolefinically unsaturated monocarboxylic acids and particularly acrylic and methacrylic acids.

The preferred polymers embodied in this invention are those composed of units derived from the polymerization of a mixture of (1) from about 50 to about 93% by weight of a conjugated diolefin, (2) from about 4 to about 49.8% by weight of an ester of an alpha,beta-monoolefinically unsaturated monocarboxylic acid copolymerizable with (1), (3) from about 0 to 5% by weight of a monovinyl cyanide, (4) from about 0 to 5% by weight of a monovinyl aromatic compound, (5) from about 0.1 to about 3% by weight of an N-alkylol amide of an alpha,beta-monoolefinically unsaturated monocarboxylic acid, and (6) from about 0.1 to about 5% by weight of an alpha,beta-monoolefinically unsaturated monocarboxylic acid. In the above-described proportions it is to be understood that when a maximum amount of one monomer is employed in the polymerization mixture that the relative proportions of the remaining monomers must be adjusted so that the combined weight percentage of monomers used in any single polymer will total substantially 100%.

The polymers embodied in this invention are prepared in the preferred manner in an aqueous medium in the presence of a suitable polymerization catalyst in the range of from about 40 to 60% total solids. The aqueous medium may be emulsifier-free or it may contain an emulsifier. Suitable emulsifiers include organic sulfates and sulfonates such as sodium lauryl sulfate, the alkali metal salts of sulfonated petroleum or paraffin oils, the sodium salts of aromatic sulfonic acids such as the sodium salt of naphthalene sulfonic acids, the sodium salts of dodecane-1-sulfonic acid, octadecane-1-sulfonic acid, etc.; aralkyl sulfonates such as sodium isopropyl benzene sulfonate, sodium dodecyl benzene sulfonate and sodium isobutyl naphthalene sulfonate; alkali metal salts of sulfonated dicarboxylic acid esters and amides such as sodium dioctyl sulfo succinate, sodium N-octadecyl sulfo succinamate and the like, and others. The so-called cationic emulsifiers such as the salts of strong inorganic acids and organic bases containing long carbon chains, for example, lauryl amine hydrochloride, the hydrochloride of diethylaminoethyl decylamine, trimethyl cetyl ammonium bromide, dodecyl trimethyl ammonium bromide, the diethyl cyclohexylamine salt of cetyl sulfuric ester, and others may be used. Preferred, however, are the alkali metal salts of aromatic sulfonic acids and the sodium salts of aralkyl sulfonates. In addition to the above and other polar or ionic emulsifiers, still other materials which may be used, singly or in combination with one or more of the above types of emulsifiers include the so-called "non-ionic" emulsifiers such as the polyether alcohols prepared by condensing ethylene or propylene oxide with higher alcohols, the fatty alkylolamine condensates, the diglycol esters of lauric, oleic and stearic acids, and others. It is often desirable to add post-polymerization emulsifiers to the latices embodied herein for improved stability.

The catalyst, required for satisfactory polymerization rate, may be any of those commonly employed for the polymerization of butadiene hydrocarbons including the various peroxygen compounds such as hydrogen peroxide, benzoyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium and ammonium persulfate and others.

Particularly preferred as polymerization initiators are the water-soluble peroxygen compounds such as hydrogen peroxide and the sodium, potassium and ammonium persulfates, the water-soluble oxidation-reduction or "redox" types of catalysts, and the heavy metal activated, water-soluble peroxygen and redox catalysts. Included in this preferred list are the water-soluble persulfates; the combination of one of the water-soluble peroxygen compounds such as potassium persulfate with a reducing substance such as a polyhydroxy phenol, an oxidizable sulfur compound such as sodium bisulfite, sodium sulfite and the like; the combination of a water-soluble peroxygen compound such as potassium persulfate with a reducing substance such as a polyhydroxy phenol, an oxidizable sulfur compound such as sodium bisulfite, sodium sulfite and the like; the combination of a water-soluble peroxygen compound such as potassium persulfate and dimethylaminopropionitrile; the combination of a water-soluble peroxygen compound with a reducing sugar or with a combination of a diazomercapto compound and a water-soluble ferricyanide compound and others. Heavy metal ions which greatly activate potassium persulfate catalyzed and the redox catalyzed polymerizations include those of silver, copper(ic), iron, cobalt, nickel and others. The preferred range of catalyst as above defined is from about 0.01 to about 3 parts by weight per one-hundred parts by weight of monomers.

It is generally desirable to incorporate from 0.1 to 5% by weight of an antioxidant or a mixture of antioxidants such as the hindered phenols and diaryl amines into the latex or into the coagulated polymers embodied herein.

While the polymerization may be carried out in the presence of air, the rate of reaction is ordinarily faster in the absence of oxygen and hence polymerization in an evacuated vessel, at reflux, or under an inert atmosphere such as nitrogen is preferred. The temperature at which the polymerization is carried out is not critical, it may be varied widely from −30° C. to 100° C. or higher, though best results are generally obtained at a temperature of from about 0° C. to about 70° C. While the pH of the polymerization system is not critical, it is preferred that a pH of 7 or below be employed during the polymerization reaction. The polymer latex may subsequently be adjusted to any desired pH.

Other polymerization techniques and practices conventionally employed in the preparation of butadiene-acrylate synthetic rubbers may also be used in polymerizing the monomer mixtures herein described. For example, the use of mercaptan modifiers in the reaction mixture is often desirable and results in lower raw polymer viscosity and other allied plastic properties. Modifiers such as the primary, secondary and tertiary aliphatic mercaptans containing from 4 to 16 carbon atoms are particularly useful in this invention. Still other substances which desirably may be incorporated into the reaction medium include buffers, electrolyte salts (see "Synthetic Rubber," G. S. Whitby, John Wiley & Sons, Inc., New York, 1954, pages 226 and 227), carbon black and others in a manner well understood in the art. Moreover, the polymerization may be terminated, as by addition of a polymerization inhibitor such as hydroquinone or phenyl beta-naphthyl amine, before conversion of the monomers to polymer is complete. The higher the conversion, everything else being equal, the higher the gel or insoluble content of the polymer will be. Polymers prepared by stopping the reaction at 50–90% conversion are generally more plastic, more soluble, and are possessed of as good or better tensile strength than the polymers prepared at substantially complete conversion. Polymers employed in the latex form for dipping, coating and impregnating of leather, paper and textile fabrics can be carried to from 90–100% conversion in the polymerization reaction and high Mooney viscosities are particularly desirable. Higher Mooney viscosities are conveniently obtained by the use of about 0.2 part or less of mercaptan modifier in the polymerization recipe.

The polymers of this invention are useful in the latex form or in the coagulated, rubber form depending upon the particular end use. The polymers of this invention may be isolated from latex by coagulation with the conventional alcohol or salt-acid coagulants or they may be isolated by freeze agglomeration. In general, the latex form of the polymer is most useful for coating, impregnating and dipping operations. The latex may be used, per se, it may be diluted to lower solids content or it may be blended with other dispersions or latices of other rubbery or plastic materials. It is often desirable to blend thickeners and bodying agents with the latex for improvement of flow properties in subsequent coating and dipping operations. Well known thickening agents and stabilizers such as casein, carboxy methyl cellulose, methyl cellulose and polyacrylic acid may be used as well as other similar materials for the foregoing purpose.

The latices of this invention are useful in leather finishing, the binding of non-woven fabrics, the impregnation and coating of textile fabrics composed of synthetic, natural and natural-synthetic fiber blends, the impregnation and coating of paper, in adhesive compositions, in printing pastes for textiles and paper and the like. The latices of this invention are particularly useful for providing improved wet tensile and internal bond strength to paper and better wet soiling in non-woven fabrics. The rubbery polymers embodied herein are useful in the preparation of rubber articles such as gloves, gaskets, foams, tires, hose, shock absorbers, footwear, flooring and the like.

It is to be understood that the polymers embodied in this invention can also be prepared in a less preferred manner by employing amides or alpha,beta-olefinically unsaturated carboxylic acids in place of their N-alkylol derivatives disclosed above, providing the resulting polymers are subsequently reacted with an aldehyde such as formaldehyde or formalin to form the N-alkylol derivative of the amide in situ.

In the following illustrative examples the quantities of ingredients used are expressed in parts by weight unless otherwise indicated.

EXAMPLE I

An interpolymer (A) of butadiene, ethyl acrylate, methyl methacrylate, acrylonitrile, acrylic acid and N-methylol acrylamide was prepared in a batch charge at about 45–55° C. in an essentially oxygen free atmosphere of nitrogen from the following recipe:

| | A |
|---|---|
| Butadiene | 64 |
| Ethyl acrylate | 10 |
| Methyl methacrylate | 20 |
| Acrylonitrile | 3 |
| Acrylic acid | 1.2 |
| N-methylol acrylamide | 1.8 |
| Water | 88 |
| Sodium dodecyl benzene sulfonate | 2.5 |
| Sodium salt of naphthalene sulfonic acid | 0.5 |
| Tertiary $C_{12}$ mercaptan | 0.2 |
| Sodium sulfate (electrolyte) | 0.6 |
| Sodium hydrosulfite | 0.03 |
| Versene Fe 3 (90% EDTA tetrasodium salt and 10% sodium salt of N-di(hydroxy ethyl) glycine | 0.2 |
| Sulfuric acid | 0.04 |
| Ammonium persulfate | 0.3 |

The polymerization was initiated at 45° C. and the temperature was slowly raised to 55° C. during the course of the reaction. At about 25% conversion a solution of 4.0 parts water and 1 part

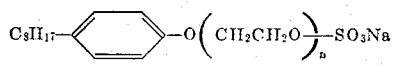

(triton X–202) was injected into the reaction mixture. At about 90–95% conversion the reaction was short-stopped with 0.5 part tertiary amyl hydroquinone (Santovar A) and the resulting latex was stabilized by the addition of 1.5 parts of ditertiary butyl p-cresol and dilute ammonium hydroxide was added to adjust the pH of the latex to about 7. The total reaction time was about 35–40 hours.

Table 2

| | M | N | O | P | Q |
|---|---|---|---|---|---|
| Butadiene | 64 | 64 | 65.75 | 71 | 90 |
| Ethyl acrylate | | 20 | 20 | 11 | 4 |
| Methyl methacrylate | 30 | 10 | 10 | 12 | |
| Acrylonitrile | 3 | 3 | 3 | 3 | 3 |
| Acrylic acid | 1.2 | 1.2 | 0.5 | 1.2 | 1.2 |
| N-methylol acrylamide | 1.8 | 1.8 | 0.75 | 1.8 | 1.8 |
| Mooney viscosity | (¹) | (¹) | 92 | | |

¹ Crumbled.

Table 3

| | R | S | T | U | V | W | X |
|---|---|---|---|---|---|---|---|
| Butadiene | 67 | 67 | 87 | 64 | 64 | 64 | 67 |
| Ethyl acrylate | 10 | | | | | 15 | 15 |
| Methyl methacrylate | | | | | 15 | | |
| n-Butyl acrylate | 20 | 30 | 10 | | | | |
| 2-ethyl hexyl acrylate | | | | 30 | 15 | 15 | 15 |
| Acrylonitrile | | | | 3 | 3 | 3 | |
| Acrylic acid | 1.2 | 1.2 | 1.2 | 1.2 | 1.2 | 1.2 | 1.2 |
| N-methylol acrylamide | 1.8 | 1.8 | 1.8 | 1.8 | 1.8 | 1.8 | 1.8 |

The polymeric compositions (B–X) listed in Tables 1, 2 and 3 were prepared in a similar manner. Polymers B–E are control compositions used for the purpose of comparison with the polymers embodied herein.

The control polymers B–E all had Mooney viscosities in the range of from 50–70 whereas polymers F, M and N, for example, crumbled in the Mooney test (greater than 100).

EXAMPLE II

Latices of representative polymers described in Example I were first reduced to about 20% total solids by dilution with water. Each latex was then padded onto a non-woven fleece web composed of 50% nylon and 50% of a cotton-rayon mixture. The treated webs were then dried on a photoprint drier followed by a 3 minute cure at 300° F. in a circulating air oven. The bound webs were then tested for percent polymer pickup, tensile, elongation, solvent resistance, soil resistance, heat and light aging properties and wrinkle recovery. The tensile and elongation, which are expressed in pounds per square inch, were determined both in the machine direction and cross machine direction. The solvent resistance is expressed as the tensile strength in pounds per square inch after the bound web had been soaked in perchloroethylene for 20 minutes. The soiling is expressed as the photovolt reflectance after the bound web had been immersed in a standard soiling solution for 20 minutes at 140° F. followed by 10 minutes of rinsing in clear water at 140° F. The light aging is expressed as the photovolt reflectance of the bound web after it has been aged for 20 hours in the fadeometer. The Monsanto wrinkle recovery is expressed in degrees with a maximum of 180° possible for a sample which recovers fully. The results of these tests are given in Table 4.

Table 1

| | B | C | D | E | F | G | H | I | J | K | L |
|---|---|---|---|---|---|---|---|---|---|---|---|
| Butadiene | 67 | 67 | 67 | 67 | 67 | 67 | 67 | 67 | 67 | 50 | 93 |
| Ethyl acrylate | 33 | | 30 | | 30 | | 10 | 32.8 | | 23 | |
| Methyl methacrylate | | 33 | | 30 | | 30 | 20 | | 32.8 | 24 | 4 |
| Acrylic acid | | | 3 | 3 | 1.2 | 1.2 | 1.2 | 0.1 | 0.1 | 1.2 | 1.2 |
| N-methylol acrylamide | | | | | 1.8 | 1.8 | 1.8 | 0.1 | 0.1 | 1.8 | 1.8 |
| Mooney viscosity | 55 | 56 | 65 | 100 | (¹) | 94 | | | | | |

¹ Crumbled.

Table 4

| Latex | A | B | C | D | E | F | G | H | M | N | O |
|---|---|---|---|---|---|---|---|---|---|---|---|
| Percent pickup | 87 | 78 | 97 | 76 | 72 | 104 | 63 | 70 | 68 | 102 | 90 |
| Tensile: | | | | | | | | | | | |
| Machine direction | 19.8 | 7.0 | 6.4 | 8.4 | 15.4 | 9.2 | 19.2 | 12.0 | 20.0 | 18.3 | 6.9 |
| Cross machine direction | 15.0 | 3.2 | 7.6 | 6.4 | 14.8 | 8.4 | 16.4 | 10.0 | 19.0 | 15.7 | 6.5 |
| Percent elongation: | | | | | | | | | | | |
| Machine direction | 40 | 14 | 59 | 35 | 57 | 43 | 48 | 37 | 50 | 31 | 43 |
| Cross machine direction | 47 | 14 | 80 | 60 | 70 | 52 | 66 | 57 | 57 | 45 | 55 |
| Solvent resistance: Cross machine direction | 4.4 | 0 | 0 | 0 | 0 | 1.4 | 1.4 | 2.2 | 1.4 | 1.9 | 0 |
| Soiling | 47 | 33 | 33 | 28 | 42 | 65 | 52 | 53 | 66 | 69 | 72 |
| Light aging | 75 | 68 | 76 | 70 | 76 | 78 | 78 | 77 | 68 | 68 | 28 |
| Wrinkle recovery: | | | | | | | | | | | |
| Machine direction | 167 | 163 | 162 | 174 | 166 | 176 | 171 | 169 | 172 | 174 | 169 |
| Cross machine direction | 175 | 157 | 162 | 172 | 169 | 172 | 170 | 166 | 172 | 170 | 175 |

EXAMPLE III

The compositions used in this example are described in Example I. The latex was first diluted to 15% total solids with water. An 11 ml. Munising flat paper which had previously been conditioned at 72° F. and 65% relative humidity was saturated in each case by floating the paper on top of the latex bath. The papers, after being coated on both sides in the foregoing manner, were cured at 212° F. for 3 minutes (Table 5) and at 325° F. for 3 minutes (Table 6). The resulting papers were conditioned at 72° F. for 16 hours prior to testing.

I claim:

1. The interpolymer of (1) from about 50 to about 93% by weight of a conjugated diolefin having from 4 to 9 carbon atoms, (2) from about 4 to about 49.8% by weight of at least one ester of an alpha,beta-olefinically unsaturated monocarboxylic acid having the structure

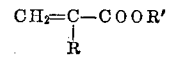

wherein R is a member selected from the class consisting of hydrogen, an alkyl group having from 1 to 6 carbon Table 5

| Latex | A | D | E | G | H | I | J | K | M | O | R | S | T |
|---|---|---|---|---|---|---|---|---|---|---|---|---|---|
| Tensile, p.s.i.: | | | | | | | | | | | | | |
| Dry | 28.4 | 23.0 | 26.9 | 27.5 | 21.9 | 22.6 | 30.8 | 39.6 | 35.8 | 20.8 | 26.6 | 25.2 | 31.4 |
| Wet | 11.2 | 1.7 | 2.0 | 4.9 | 10.0 | 4.1 | 3.6 | 11.6 | 15.7 | 3.1 | 6.7 | 8.6 | 7.9 |
| Percent elongation | 10.5 | 6.0 | 8.5 | 8.7 | 7.5 | 5.0 | 6.2 | 6.0 | 9.2 | 7.0 | 6.0 | 4.5 | 5.2 |
| Edge tear, p.s.i. | 36.1 | 17.3 | 29.1 | 30.2 | 26.3 | 14.0 | 30.9 | 32.0 | 49.8 | 18.0 | 18.0 | 17.3 | 19.1 |
| Internal bond, oz./in | 13.6 | 6.4 | 9.2 | 16.4 | 8.0 | 4.8 | 6.4 | 9.6 | 11.4 | 5.6 | 6.4 | 8.0 | 11.2 |

Table 6

| Latex | A | B | C | D | E | F | G | H | I | J | K | L | M | N | O | P | Q | R | S | T |
|---|---|---|---|---|---|---|---|---|---|---|---|---|---|---|---|---|---|---|---|---|
| Tensile, p.s.i.: | | | | | | | | | | | | | | | | | | | | |
| Dry | 35.5 | 17.9 | 23.7 | 26.0 | 28.0 | 38.4 | 33.6 | 27.2 | 28.3 | 36.2 | 36.0 | 39.4 | 45.1 | 49.4 | 28.1 | 38.5 | 37.8 | 46.8 | 54.2 | 48.9 |
| Wet | 30.3 | 7.7 | 10.5 | 8.7 | 8.4 | 21.6 | 19.0 | 21.5 | 14.8 | 12.8 | 34.0 | 22.1 | 27.7 | 26.3 | 19.4 | 24.1 | 22.2 | 27.4 | 29.2 | 27.1 |
| Percent elongation | 8.0 | 4.0 | 11.2 | 7.0 | 10.0 | 8.0 | 14.2 | 7.5 | 6.0 | 7.5 | 8.0 | 7.0 | 9.5 | 11.0 | 7.0 | 9.5 | 7.0 | 6.5 | 7.0 | 7.0 |
| Edge tear, p.s.i. | 50.7 | 9.2 | 33.0 | 23.5 | 41.2 | 52.0 | 58.7 | 38.0 | 22.5 | 35.0 | 27.0 | 21.0 | 48.2 | 50.0 | 32.1 | 48.0 | 26.2 | 27.0 | 22.5 | 25.0 |
| Internal bond, oz./in | 24.0 | 3.2 | 16.0 | 9.6 | 12.4 | 10.6 | 22.0 | 11.5 | 7.2 | 12.0 | 19.2 | 8.0 | 13.6 | 24.0 | 9.6 | 18.4 | 8.0 | 17.6 | 19.4 | 16.0 |
| Percent polymer pickup | 57.0 | 53.2 | 46.8 | 58.4 | 47.4 | 46.6 | 53.3 | 51.3 | 54.6 | 52.1 | 49.0 | 50.0 | 45.9 | 44.0 | 55.3 | 44.6 | 52.2 | 54.8 | 48.3 | 56.6 |

EXAMPLE IV

The procedure given in Example III was repeated using endura crepe paper in place of the Munising flat paper and 25% total solids latices. The results of tests on the coated papers cured at 212° F. for 3 minutes are given in Table 7 and the results of tests on papers cured at 325° F. for 3 minutes are given in Table 8.

atoms, a halogen, and a cyano group and R' is a hydrocarbon group having from 1 to 12 carbon atoms, (3) from 0 to 5% by weight of a monovinyl cyanide having from 3 to 10 carbon atoms, (4) from 0 to 5% by weight of a monovinyl aromatic compound having from 8 to 18 carbon atoms, (5) from about 0.1 to about 3% by weight of a member of the group consisting of N-methylol acryl- Table 7

| Latex | A | D | E | G | H | I | J | K | M | O | R | S | T |
|---|---|---|---|---|---|---|---|---|---|---|---|---|---|
| Tensile, p.s.i.: | | | | | | | | | | | | | |
| Dry | 14.7 | 10.4 | 12.4 | 12.6 | 12.0 | 11.3 | 14.4 | 16.5 | 15.0 | 10.1 | 13.7 | 14.6 | 15.2 |
| Wet | 3.4 | 1.1 | 1.1 | 0.8 | 3.3 | 1.4 | 1.6 | 2.9 | 2.7 | 1.7 | 2.5 | 2.3 | 3.7 |
| Percent elongation | 27.0 | 21.5 | 29.0 | 27.0 | 24.0 | 21 | 25.5 | 23.5 | 25.7 | 21.5 | 22 | 22 | 23 |
| Edge tear, p.s.i. | 24.8 | 13.5 | 19.5 | 17.8 | 20.8 | 13.6 | 24.0 | 21.9 | 21.7 | 13.5 | 16.8 | 17.2 | 19.0 |
| Internal bond, oz./in | 39.0 | 20.8 | 37.2 | 43.2 | 28.8 | 16.8 | 20.8 | 26.4 | 33.6 | 24.0 | 20.0 | 19.4 | 19.4 |

Table 8

| Latex | A | B | C | D | E | F | G | H | I | J | K | L | M | N | O | P | Q | R | S | T | U | V | W | X |
|---|---|---|---|---|---|---|---|---|---|---|---|---|---|---|---|---|---|---|---|---|---|---|---|---|
| Tensile, p.s.i.: | | | | | | | | | | | | | | | | | | | | | | | | |
| Dry | 19.9 | 9.6 | 13.1 | 12.3 | 13.5 | 17.1 | 14.9 | 14.9 | 13.8 | 16.4 | 22.9 | 16.1 | 20.6 | 20.8 | 14.2 | 17.8 | 15.6 | 20.9 | 20.6 | 18.6 | 16.6 | 18.3 | 12.4 | 17.2 |
| Wet | 15.9 | 2.7 | 3.3 | 3.2 | 3.5 | 9.0 | 7.9 | 11.2 | 7.2 | 6.6 | 16.7 | 9.4 | 11.8 | 11.7 | 9.5 | 8.7 | 12.9 | 15.3 | 12.8 | 10.9 | 11.3 | 13.0 | 10.4 | |
| Percent elongation | 25.1 | 19.0 | 25.2 | 23.0 | 29.0 | 24.5 | 32.0 | 24.0 | 21.5 | 23.0 | 22.0 | 23.0 | 25.0 | 29.0 | 24.0 | 27.0 | 22.0 | 22.5 | 22.0 | 26.0 | 28.0 | 23.0 | 24.3 | |
| Edge tear, p.s.i. | 30.0 | 10.0 | 21.5 | 16.5 | 21.2 | 23.5 | 28.8 | 26.5 | 22.0 | 23.2 | 21.0 | 27.5 | 28.0 | 22.0 | 21.0 | 24.2 | | 24 | 25.5 | 26.2 | 28.0 | 25.0 | 24.0 | |
| Internal bond, oz./in | 62.4 | 12.8 | 38.4 | 23.2 | 40.4 | 33.6 | 53.2 | 47.4 | 22.4 | 23.2 | 38.4 | 33.6 | 40.8 | 41.6 | 35.2 | 27.2 | 33.6 | 28.8 | 36.8 | 30.4 | 35.2 | 38.4 | 35.6 | 35.2 |
| Percent polymer pickup | 130 | 92.6 | 85.4 | 84.3 | 82.0 | 108 | 81.6 | 98 | 104 | 101 | 132 | 96.2 | 111 | 98.5 | 83.8 | 108 | 97.4 | 104 | 109 | 112 | 106 | 89 | 97 | 97 | amide and N-methylol methacrylamide, and (6) from about 0.1 to about 5% by weight of an alpha,beta-monoolefinically unsaturated monocarboxylic acid having from 3 to 6 carbon atoms.

2. The interpolymer of (1) from about 50 to about 93% by weight of a conjugated diolefin selected from the group consisting of butadiene-1,3- isoprene, piperylene and 2-halogenated butadiene-1,3, (2) from about 4 to about 49.8% by weight of at least one ester of an alpha, beta-monoolefinically unsaturated monocarboxylic acid having the structure

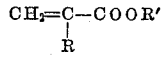

wherein R is a member selected from the class consisting of hydrogen, an alkyl group having from 1 to 6 carbon atoms, a halogen, and a cyano group and R' is a hydrocarbon group having from 1 to 12 carbon atoms, (3) from 0 to 5% by weight of monovinyl cyanide having from 3 to 10 carbon atoms, (4) from 0 to 5% by weight of a monovinyl aromatic compound having from 8 to 18 carbon atoms, (5) from about 0.1 to about 3% by weight of a member of the group consisting of N-methylol acrylamide and N-methylol methacrylamide, and (6) from about 0.1 to about 5% by weight of an alpha,beta-monoolefinically unsaturated monocarboxylic acid having from 3 to 6 carbon atoms.

3. The interpolymer of (1) from 50 to 93% by weight of butadiene-1,3, (2) from 4 to 49.8% by weight of at least one compound having the structure

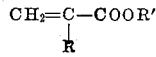

wherein R is a member selected from the class consisting of hydrogen, an alkyl group having from 1 to 6 carbon atoms, a halogen, and a cyano group and R' is a hydrocarbon group having from 1 to 12 carbon atoms, (3) from 0 to 5% by weight of acrylonitrile, (4) from 0 to 5% by weight of styrene, (5) from 0.1 to 3% by weight of N-methylol arcylamide and (6) from 0.1 to 5% of acrylic acid.

4. The interpolymer of (1) from 50 to 93% by weight of butadiene-1,3, (2) from 4 to about 49.8% by weight of ethyl acrylate, (3) from 0 to 5% by weight of acrylonitrile, (4) from 0 to 5% by weight of styrene, (5) from 0.1 to 3% by weight of N-methylol acrylamide and (6) from 0.1 to 5% by weight of acrylic acid.

5. The interpolymer of (1) from 50 to 93% by weight of butadiene-1,3, (2) from 4 to 49.8% by weight of methyl methacrylate, (3) from 0 to 5% by weight of acrylonitrile, (4) from 0 to 5% by weight of styrene, (5) from 0.1 to 3% by weight of N-methylol acrylamide and (6) from 0.1 to 5% by weight of acrylic acid.

6. The interpolymer of (1) from 50 to 93% by weight of butadiene-1,3, (2) from 4 to 49.8% by weight of n-butyl acrylate, (3) from 0 to 5% by weight of acrylonitrile, (4) from 0 to 5% by weight of styrene, (5) from 0.1 to 3% by weight of N-methylol acrylamide and (6) from 0.1 to 5% by weight of acrylic acid.

7. The interpolymer of (1) from 50 to 93% by weight of butadiene-1,3, (2) from 4 to 49.8% by weight of 2-ethyl hexyl acrylate, (3) from 0 to 5% by weight of acrylonitrile, (4) from 0 to 5% by weight of styrene, (5) from 0.1 to 3% by weight of N-methylol acrylamide and (6) from 0.1 to 5% by weight of acrylic acid.

8. The method for preparing an interpolymer comprising polymerizing to from 90 to 100% conversion in aqueous dispersion at a temperature of from about −30° C. to about 100° C. a mixture of (1) from about 50 to about 93% by weight of a conjugated diolefin having from 4 to 9 carbon atoms, (2) from about 4 to about 49.8% by weight of at least one ester of an alpha,beta-olefinically unsaturated monocarboxylic acid having the structure

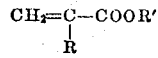

wherein R is a member selected from the class consisting of hydrogen, an alkyl group having from 1 to 6 carbon atoms, a halogen, and a cyano group and R' is a hydrocarbon group having from 1 to 12 carbon atoms, (3) from 0 to 5% by weight of a monovinyl cyanide having from 3 to 10 carbon atoms, (4) from 0 to 5% by weight of a monovinyl aromatic compound having from 8 to 18 carbon atoms, (5) from about 0.1 to about 5% by weight of a member of the group consisting of N-methylol acrylamide and N-methylol methacrylamide, and (6) from about 0.1 to about 10% by weight of an alpha,beta-monoolefinically unsaturated monocarboxylic acid having from 3 to 6 carbon atoms.

9. The method for preparing an interpolymer comprising polymerizing in aqueous dispersion at a temperature of from about 0° C. to about 70° C. in the absence of oxygen a mixture of (1) from 50 to about 93% by weight of a conjugated diene selected from the group consisting of butadiene-1,3, isoprene, piperylene and 2-halogenated butadiene-1,3, (2) from about 4 to about 49.8% by weight of at least one ester of an alpha,beta-olefinically unsaturated monocarboxylic acid having the structure

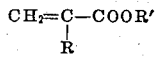

wherein R is a member selected from the class consisting of hydrogen, an alkyl group having from 1 to 6 carbon atoms, a halogen, and a cyano group and R' is a hydrocarbon group having from 1 to 12 carbon atoms, (3) from 0 to 5% by weight of a monovinyl cyanide having from 3 to 10 carbon atoms, (4) from 0 to 5% by weight of a monovinyl aromatic compound having from 8 to 18 carbon atoms, (5) from about 0.1 to about 3% by weight of a member of the group consisting of N-methylol acrylamide and N-methylol methacrylamide, and (6) from about 0.1 to about 5% by weight of an alpha,beta-monoolefinically unsaturated monocarboxylic acid having from 3 to 6 carbon atoms.

10. An aqueous latex of an interpolymer of (1) from about 50 to about 93% by weight of a conjugated diolefin having from 4 to 9 carbon atoms, (2) from about 4 to about 49.8% by weight of at least one ester of an alpha, beta-olefinically unsaturated monocarboxylic acid having the structure

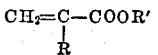

wherein R is a member selected from the class consisting of hydrogen, an alkyl group having from 1 to 6 carbon atoms, a halogen, and a cyano group and R' is a hydrocarbon group having from 1 to 12 carbon atoms, (3) from 0 to 5% by weight of a monovinyl cyanide having from 3 to 10 carbon atoms, (4) from 0 to 5% by weight of a monovinyl aromatic compound having from 8 to 18 carbon atoms, (5) from about 0.1 to about 3% by weight of a member of the group consisting of N-methylol acrylamide and N-methylol methacrylamide, and (6) from about 0.1 to about 5% by weight of an alpha,beta-monoolefinically unsaturated monocarboxylic acid having from 3 to 6 carbon atoms.

References Cited in the file of this patent

UNITED STATES PATENTS 2,680,110 Loughran _____ June 1, 1954
2,849,426 Miller _____ Aug. 26, 1958